(12) United States Patent
Chatterjee et al.

(10) Patent No.: US 7,653,836 B1
(45) Date of Patent: Jan. 26, 2010

(54) LOGGING METADATA MODIFICATIONS IN A DATA STORAGE SYSTEM

(75) Inventors: Paresh Chatterjee, Fremont, CA (US);
Ajit Narayanan, Fremont, CA (US);
Vijayarankan Muthirisavenugopal, Chennai (IN); Anandh Mahalingam, Fremont, CA (US)

(73) Assignee: American Megatrends, Inc, Norcross, GA (US)

( * ) Notice: Subject to any disclaimer, the term of this patent is extended or adjusted under 35 U.S.C. 154(b) by 433 days.

(21) Appl. No.: 11/450,778

(22) Filed: Jun. 9, 2006

Related U.S. Application Data (60) Provisional application No. 60/689,292, filed on Jun. 10, 2005.

(51) Int. Cl.
*G06F 11/00* (2006.01)
(52) U.S. Cl. .......................................... 714/20; 714/15
(58) Field of Classification Search .............. 714/15–21
See application file for complete search history.

(56) References Cited

U.S. PATENT DOCUMENTS

| | | | | |
|---|---|---|---|---|
| 6,826,615 | B2 * | 11/2004 | Barrall et al. | 709/227 |
| 7,266,644 | B2 * | 9/2007 | Nakatani et al. | 711/124 |
| 7,412,496 | B2 * | 8/2008 | Fridella et al. | 709/219 |
| 7,433,898 | B1 * | 10/2008 | Georgiev | 707/202 |
| 2004/0111557 | A1 * | 6/2004 | Nakatani et al. | 711/113 |
| 2005/0080762 | A1 * | 4/2005 | Nakashima et al. | 707/1 |
| 2005/0188248 | A1 * | 8/2005 | O'Brien et al. | 714/5 |

OTHER PUBLICATIONS

Shirriff, Kenneth William; Sawmill: A Logging File System for a High-Performance RAID Disk Array, 1995, University of California at Berkeley, pp. 1-2,29-31,90-91.*

* cited by examiner

*Primary Examiner*—Dieu-Minh Le
(74) *Attorney, Agent, or Firm*—Hope Baldauff Hartman, LLC (57) ABSTRACT

A method, system, apparatus, and computer-readable medium for logging metadata modifications in a storage system are provided. According to one method, modifications to storage system metadata are detected and described in a log string data structure. The log strings are collected and periodically committed to a mass storage device in the data storage system. The log strings may be collected in a log buffer data structure that includes the collected log strings and one or more unique, constantly increasing timestamps. The time stamps are written at the end of each sector of the log buffer. The log buffer may be committed to the mass storage device when the log buffer is full, when a predefined period of time has elapsed since the previous commitment of the log strings to disk, or in a manner designed to ensure that one write of the log buffer is always outstanding. A logger module is operative to collect the log strings, build the log buffer, and to commit the log buffer to disk.

14 Claims, 11 Drawing Sheets

LOGGING METADATA MODIFICATIONS IN A DATA STORAGE SYSTEM

CROSS-REFERENCE TO RELATED APPLICATIONS

This application claims the benefit of U.S. provisional patent application No. 60/689,292, filed on Jun. 10, 2005 and entitled "A Novel Method of Performing Metadata Writes in a Storage System Through Logging", and which is expressly incorporated herein by reference in its entirety.

TECHNICAL FIELD

The computer systems described herein are related to the field of computer data storage systems. More particularly, the computer systems described herein are related to the field of storing metadata for a computer data storage system.

BACKGROUND

Many data storage systems maintain persistent metadata in order to reliably be brought back up in the event of improper system shutdown or catastrophic system failure. This is especially true of storage systems that maintain a lookup table or a map table to perform input/output ("I/O") operations. A lookup table is necessary in systems that implement advanced storage features such as snapshots and thin provisioning.

In order to ensure that data writes that have been signaled as completed successfully to the initiator are not lost on catastrophic system failure, it is necessary to make an update of the lookup table part of the path of an I/O operation. The traditional methods of updating metadata tables, such as a lookup table, is to write the corresponding parts of the table to disk or to maintain a fragmented representation of the table on disk and update it as needed. Both of these methods, however, are costly in terms of I/O performance and the amount of space required on disk. In particular, since any write I/O that is smaller than a sector requires a read-modify-write operation, applications currently choose to either write metadata corresponding to several portions of the disk into the same sector, or write each unit of metadata to a different portion of the disk. The disadvantage of the former method is that it is necessary to lock out several other I/O operations that would share the same metadata sector during one non-overlapping I/O operation. The disadvantage of the second method is that for substantial amounts of metadata, the amount of disk space required to store it is unacceptably large. Another disadvantage of existing systems is that it is often necessary to refer to data that has been previously persisted to disk. For instance, if a change is required on a sub-sector level, a read-modify-write operation may be needed.

It is with respect to these considerations and others that the following disclosure has been made.

SUMMARY

A method, system, apparatus, and computer-readable medium for logging metadata modifications in a storage system are provided. Through aspects of the implementations described herein, modifications to storage system metadata structures are logged to disk, rather than by writing the metadata structures themselves. As described in greater detail herein, a log-based approach is shown to have better performance through lower disk thrashing and more efficient space utilization, and is more convenient for reconstructing the metadata, particularly in systems that utilize RAID 5.

According to one method provided herein, modifications to storage system metadata are detected and described in a log string data structure. The log string data structure includes a type data field for holding data describing the type of the modification to the metadata, a length data field for holding data indicating the length of the log string, and a string data field for holding data describing the metadata modification.

According to other aspects, the log strings are collected and periodically committed to a mass storage device in the data storage system. In this manner, changes to the metadata are stored in a log on the mass storage device. The log strings may be collected in a log buffer data structure that includes the collected log strings and one or more unique, constantly increasing timestamps. The time stamps are written at the end of each sector of the log buffer. The log buffer may be committed to the mass storage device when the log buffer is full, when a predefined period of time has elapsed since the previous commitment of the log strings to disk, or in a manner designed to ensure that one write of the log buffer is always outstanding. The log buffer may be committed to a designated log area on a mass storage device, such as a sequential section of a RAID logical device or a set of log stripes across one or more RAID devices.

According to other aspects, a logger module is operative to collect the log strings, build the log buffer, and to commit the log buffer to disk. The log strings are submitted to the logger module in a log context data structure that includes data fields for storing the log string, a callback, and a context. The logger module determines when a write to the log has been completed and calls the appropriate callback with the specified context. Through the callback, the program that caused the metadata to be modified is notified when the write of the metadata to disk has been completed. The completion of a log write may also cause the next write to be initiated.

According to another aspect, when the log is nearly full, a new metadata table is created in memory and new metadata changes are recorded in the new metadata structure. The log is also restarted and changes to the new metadata table are recorded in the log from the point of the restart. The previous metadata table is then committed to disk. The metadata can therefore be recreated by playing the log back from the restart point onto the metadata stored on disk. If a failure occurs while committing the previous metadata structure to disk, the metadata can be recreated from the first log and the restarted log.

The above-described aspects may also be implemented as a computer-controlled apparatus, a computer process, a computing system, an apparatus, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION

In the following detailed description, references are made to the accompanying drawings that form a part hereof, and in which are shown by way of illustration specific embodiments or examples. Referring now to the drawings, in which like numerals represent like elements through the several figures, aspects of the several illustrative implementations and the exemplary operating environment will be described.

Figure 1:
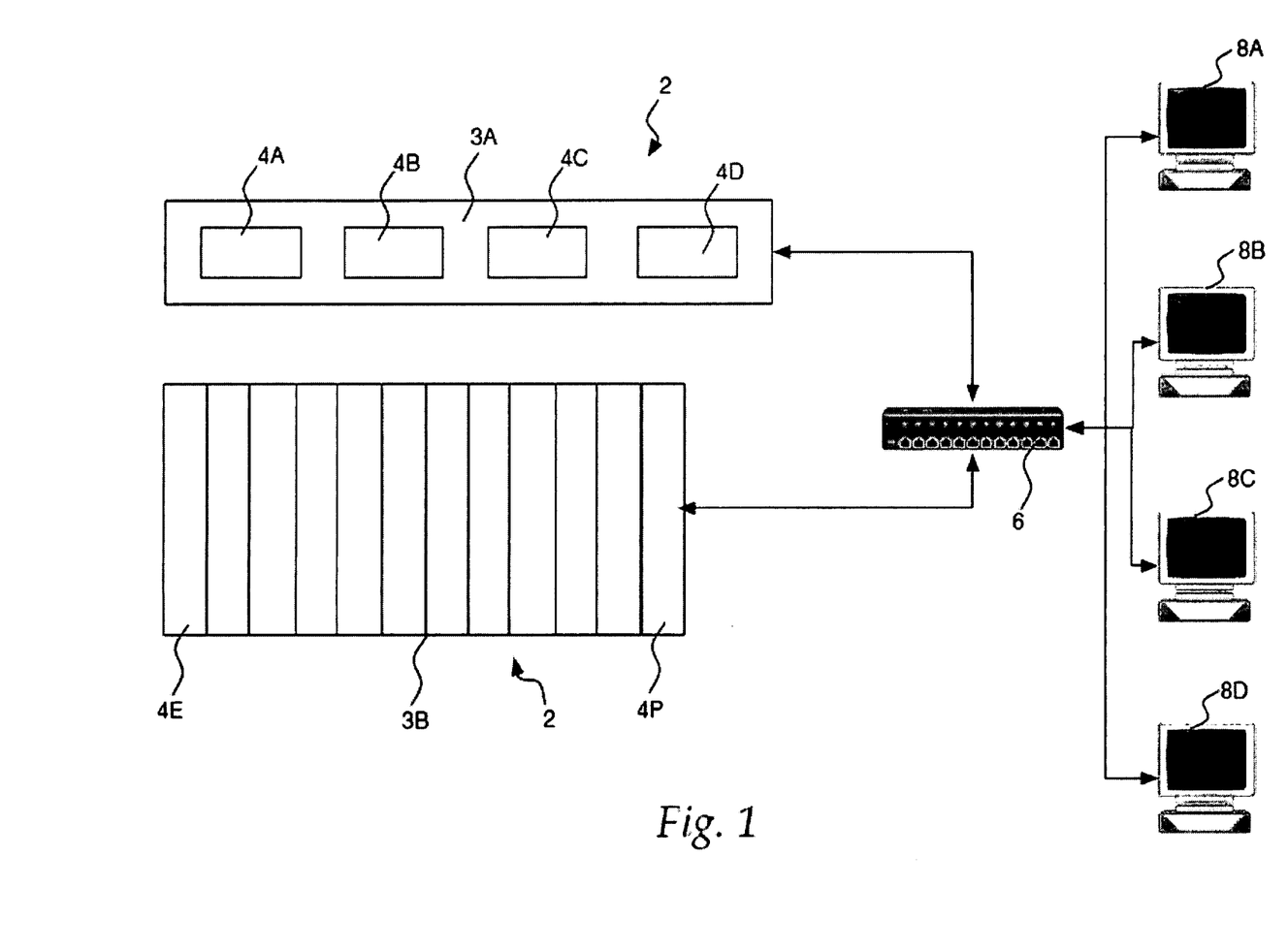
FIG. 1 is a computer network diagram showing aspects of a computer network utilized as an illustrative operating environment for the implementations described herein.
Figure 2:
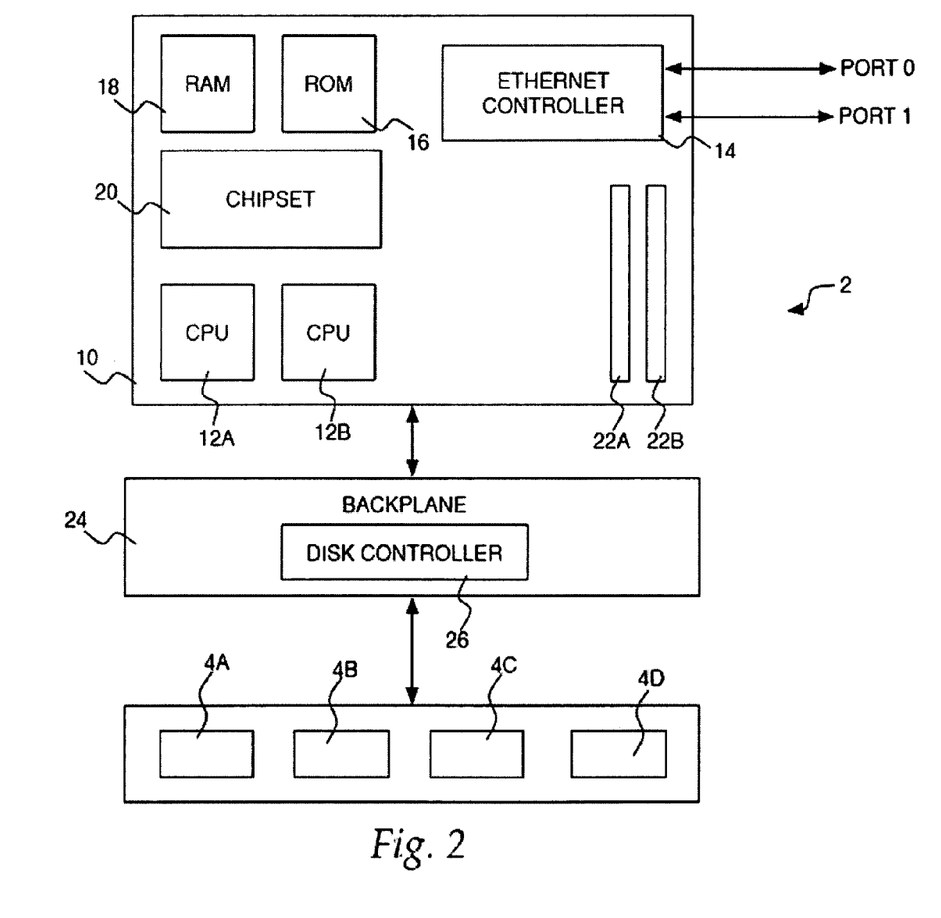
FIG. 2 is a computer architecture and network diagram illustrating aspects of a storage server computer provided herein.
Figure 3:
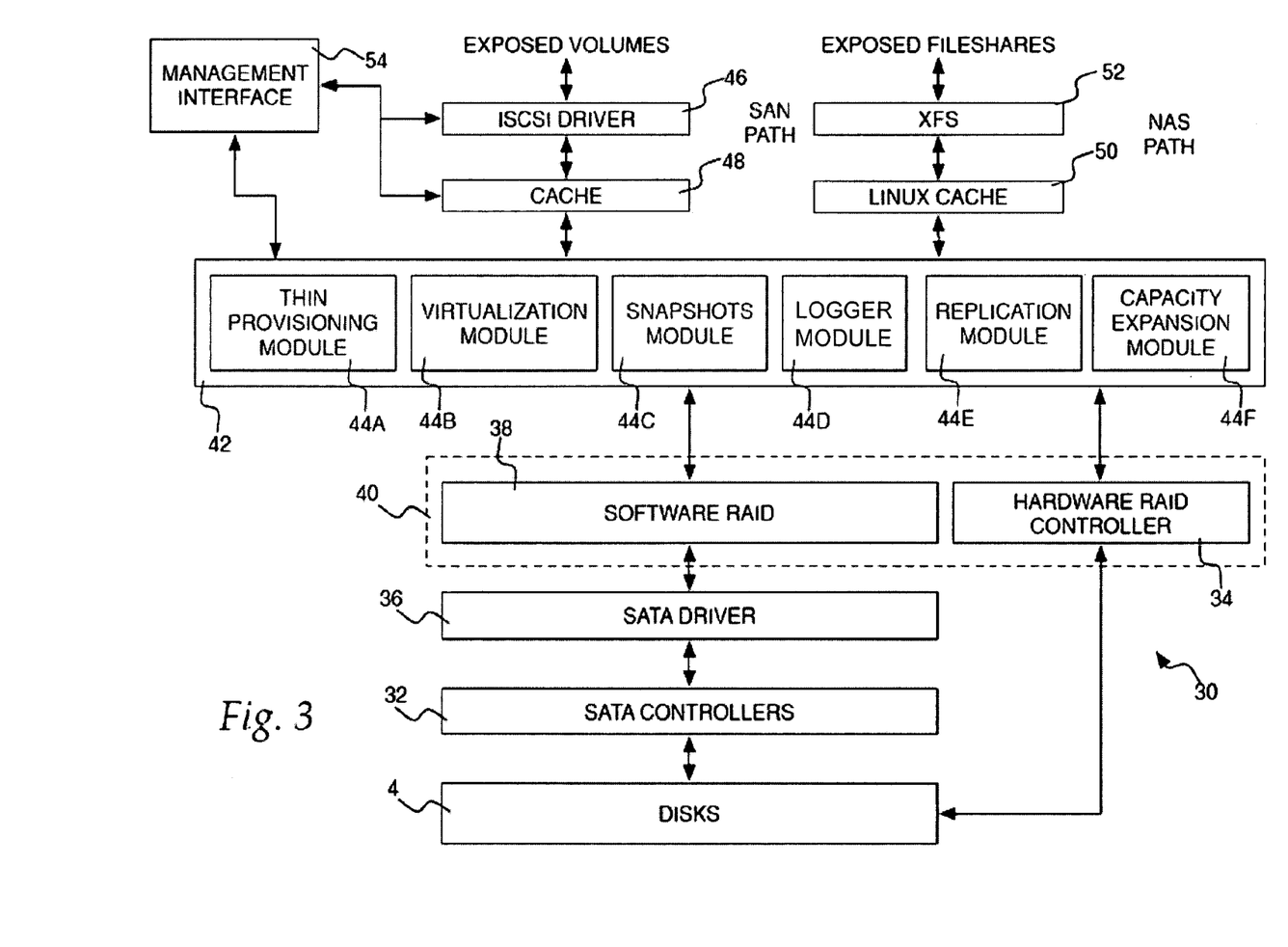
FIG. 3 is a software architecture diagram illustrating various aspects of a storage stack utilized by a storage server provided herein.

FIGS. 1-3 and the following discussion are intended to provide a brief, general description of a suitable computing environment in which the computer systems described herein may be implemented. Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The implementations described herein may also be practiced in distributed computing environments where tasks are performed by remote processing devices that are linked through a communications network. In a distributed computing environment, program modules may be located in both local and remote memory storage devices. While the embodiments presented herein will be described in the general context of program modules that execute in conjunction with an operating system on a computer system, those skilled in the art will recognize that the invention may also be implemented in combination with other program modules. Moreover, although the embodiments presented herein will be described in the context of an array of hard disk drives, it should be appreciated that the embodiments may be utilized with any type of mass storage device. Moreover, it should be appreciated that the various aspects described herein may also be utilized in many cases with a single mass storage device.

Referring now to FIG. 1, an illustrative operating environment for the various embodiments presented herein will be described. As shown in FIG. 1, the embodiments described herein may be implemented in a storage server computer 2 that is operative to receive and respond to requests to read and write data to and from a mass storage array, such as an array of hard disk drives. According to various implementations, the storage server computer 2 may be housed in a one rack space unit 3A storing up to four hard disk drives 4A-4D. Alternatively, the storage server computer may be housed in a three rack space unit 3B storing up to fifteen hard disk drives 4E-4P. Other types of enclosures may also be utilized that store fewer or more hard disk drives. In this regard, it should be appreciated that the type of storage enclosure and number of hard disk drives utilized is not generally significant to the implementation of the embodiments described herein. Any type of storage enclosure and virtually any number of hard disk devices or other types of mass storage devices may be utilized.

According to embodiments, the storage server computer 2 includes one or more network ports operatively connected to a network switch 6 using appropriate network cabling. It should be appreciated that, according to embodiments, Ethernet or Gigabit Ethernet may be utilized. However, it should also be appreciated that other types of suitable physical connections may be utilized to form a network of which the storage server computer 2 is a part.

The network switch 6 is connected to one or more client computers 8A-8D (also referred to herein as "initiators"). It should be appreciated that other types of networking topologies may be utilized to interconnect the clients and the storage server. It should also be appreciated that the initiators 8A-8D may be connected to the same local area network ("LAN") as the storage server computer 3 or may be connected to the storage server computer 2 via a distributed wide area network, such as the Internet. An appropriate protocol, such as the Internet Small Computer Systems Interface ("iSCSI") protocol or the Serial Attached SCSI ("SAS") protocol may be utilized to enable the initiators 8A-8D to communicate with and utilize the various functions of the storage server computer 2 over a wide area network such as the Internet.

According to the various aspects of the provided herein, the storage server computer 2 is operative to receive and respond to requests from the initiators 8A-8D to read or write data on the hard disk drives 4A-4P. As described in greater detail herein, the storage server computer 2 is operative to provide advanced features for data storage and retrieval to the clients. In particular, the storage server computer may provide redundant array of inexpensive disks ("RAID") functionality for the hard disk drives 4A-4P. The storage server computer 2 may also allow the hard disk drives 4A-4P to be partitioned into logical volumes for access by the initiators 8A-8D. Additional advanced features described herein, including the ability to log storage system metadata modifications to the drives 4A-4P, may also be provided by the storage server computer 2.

Turning now to FIG. 2, an illustrative computer hardware architecture for practicing the various embodiments provided herein will now be described. In particular, FIG. 2 shows an illustrative computer architecture and implementation for the storage server computer 2. In particular, the storage server computer 2 includes a baseboard 10, or "motherboard", which is a printed circuit board to which a multitude of components or devices may be connected by way of a system bus or other electrical communication path. In one illustrative embodiment, these components include, without limitation, one or more central processing units ("CPU") 12A-12B, a network adapter, such as the Ethernet controller 14, a system memory, including a Read Only Memory 16 ("ROM") and a Random Access Memory 18 ("RAM"), and other hardware for performing input and output, such as a video display adapter or a universal serial bus ("USB") port, not all of which are illustrated in FIG. 2.

The motherboard 10 may also utilize a system board chipset 20 implementing one or more of the devices described herein. One or more hardware slots 22A-22B may also be provided for expandability, including the addition of a hardware RAID controller to the storage server computer 2. It should also be appreciate that, although not illustrated in FIG. 2, a RAID controller may also be embedded on the motherboard 10 or implemented in software by the storage server computer 2. A SAS controller may also be embedded in the motherboard 10. It is also contemplated that the storage server computer 2 may include other components that are not explicitly shown in FIG. 2 or may include fewer components than illustrated in FIG. 2.

As described briefly above, the motherboard 2 utilizes a system bus to interconnect the various hardware components. The system bus utilized by the storage server computer 2 provides a two-way communication path for all components connected to it. As discussed briefly above, the system memory in the storage server computer 2 may include a RAM 18 and a ROM 16. The ROM 16 may store a basic input/output system or Extensible Firmware Interface ("EFI") compatible firmware that includes program code containing the basic routines that help to transfer information between elements within the storage server computer 2. As also described briefly above, the Ethernet controller 14 may be capable of connecting the local storage server computer 2 to the initiators 8A-8D via a network. Connections which may be made by the network adapter may include local area network LAN or WAN connections. LAN and WAN networking environments are commonplace in offices, enterprise-wide computer networks, intranets, and the Internet. The CPUs 12A-12B utilized by the storage server computer 2 are standard central processing units that perform the arithmetic and logical operations necessary for the operation of the storage server computer 2. CPUs are well-known in the art, and therefore not described in further detail herein. A graphics adapter may or may not be utilized within the storage server computer 2 that enables the display of video data (i.e., text and/or graphics) on a display unit.

As shown in FIG. 2, the motherboard 10 is connected via a backplane 24 and disk controller 26 to one or more mass storage devices. The mass storage devices may comprise hard disk drives 4A-4D or other types of mass storage devices. The mass storage devices may store an operating system suitable for controlling the operation of the storage server computer 2, such as the LINUX operating system. The hard disk drives may also store application programs and virtually any other type of data. It should be appreciated that the operating system comprises a set of programs that control operations of the storage server computer 2 and allocation of resources. The set of programs, inclusive of certain utility programs, may also provide a graphical user interface to a user. An application program is software that runs on top of the operating system software and uses computer resources made available through the operating system to perform application specific tasks desired by the user.

The mass storage devices and their associated computer-readable media, provide non-volatile storage for the storage server computer 2. Although the description of computer-readable media contained herein refers to a mass storage device, such as a hard disk or CD-ROM drive, it should be appreciated by those skilled in the art that computer-readable media can be any available media that can be accessed by the local storage server. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Turning now to FIG. 3, an illustrative computer software architecture for practicing the various embodiments provided herein will now be described. In particular, FIG. 3 illustrates a storage stack 30 utilized in the various implementations provided herein. At the top of the storage stack 30, storage volumes or fileshares are exposed to the initiators 8A-8D. At the bottom of the storage stack 30 are the actual mass storage devices, such as the disks 4, that are utilized to store the data. The mass storage devices are, in turn, connected to a disk controller, such as a Serial ATA ("SATA") controller 32 or a hardware RAID controller 34. In the case of a SATA controller, a SATA driver 36 may be utilized to access the hardware device. Additionally, a software RAID module 38 may also be utilized to provide RAID services in the absence of a hardware RAID controller 34. A unified RAID management layer 40 may be utilized to simplify the utilization of RAID with either software or hardware implementations.

The RAID management layer 40 is operative to create a RAID array from the disks 4. As known to those skilled in the art, RAID is a system of using multiple mass storage devices for sharing or replicating data among the devices. Depending upon the version of RAID chosen, the benefits of RAID can include increased data integrity, fault-tolerance, and throughput. A number of different RAID levels are available for use, such as RAID 0 where data is striped across multiple devices, RAID 1 where data is mirrored between devices, RAID 0+1 where data is striped and mirrored, and RAID 5 where data is striped across devices and where parity data for each stripe is distributed across all of the devices.

In RAID 5, every time a block is written to a disk, a parity block is generated within the same stripe. A block is often composed of many consecutive sectors on a disk. A series of blocks (a block from each of the disks in an array) is collectively called a stripe. If another block, or some portion of a block, is written on that same stripe, the parity block is recalculated and rewritten. The disk used for the parity block is staggered from one stripe to the next. It should be appreciated that while the embodiments described herein are described in the context of a mass storage array striped utilizing RAID 5, other RAID levels may be utilized. Additionally, other methods of creating an array from two or more mass storage devices may also be utilized.

Above the unified RAID management layer 40 sits a kernel module 42 that implements the functions described herein. In particular, the kernel module 42 may provide functionality for implementing thin provisioning, virtualization, snapshots, metadata logging, replication, and capacity expansion. These features are implemented by the modules 44A-44F, respectively. In particular, the logger module 44D provides the functionality described herein for logging storage system metadata to the disks 4. Additional details regarding the operation of the logger module 44D are provided below with respect to FIGS. 4-11.

Above the kernel module 42, a number of software components are utilized depending upon the access mechanism utilized to access the data stored on the hard disk drives 4. In particular, a Storage Area Network ("SAN") path is provided that utilizes a cache 46 and a Internet Small Computer Systems Interface ("iSCSI") driver 48. A Network Attached Storage ("NAS") path is also provided that utilizes a LINUX cache 50 and the XFS high-performance journaling file system 52. Volumes are exposed through the SAN path while fileshares are exposed through the NAS path.

It should be appreciated that the device drive 42 comprises a LINUX-compatible mass storage device driver in embodiments. However, although the embodiments presented herein are described as being implemented within a LINUX-compatible device driver, the various aspects of the several implementations may be implemented at different points within the storage stack and in conjunction with other operating systems. For instance, aspects may be implemented with the FREEBSD operating system or with the WINDOWS family of operating systems from MICROSOFT CORPORATION of Redmond, Wash. The various aspects provided herein may also be implemented on a multitude of processor families, including the Intel x86 family of processors, the Intel XScale family of processors, or the IBM PowerPC family of processors. According to embodiments, a management interface 54 may also be provided for controlling and monitoring the server 2. The management interface communicates with the various layers through software interfaces to retrieve performance data, provide configuration data, and to perform other functions.

Figure 4:
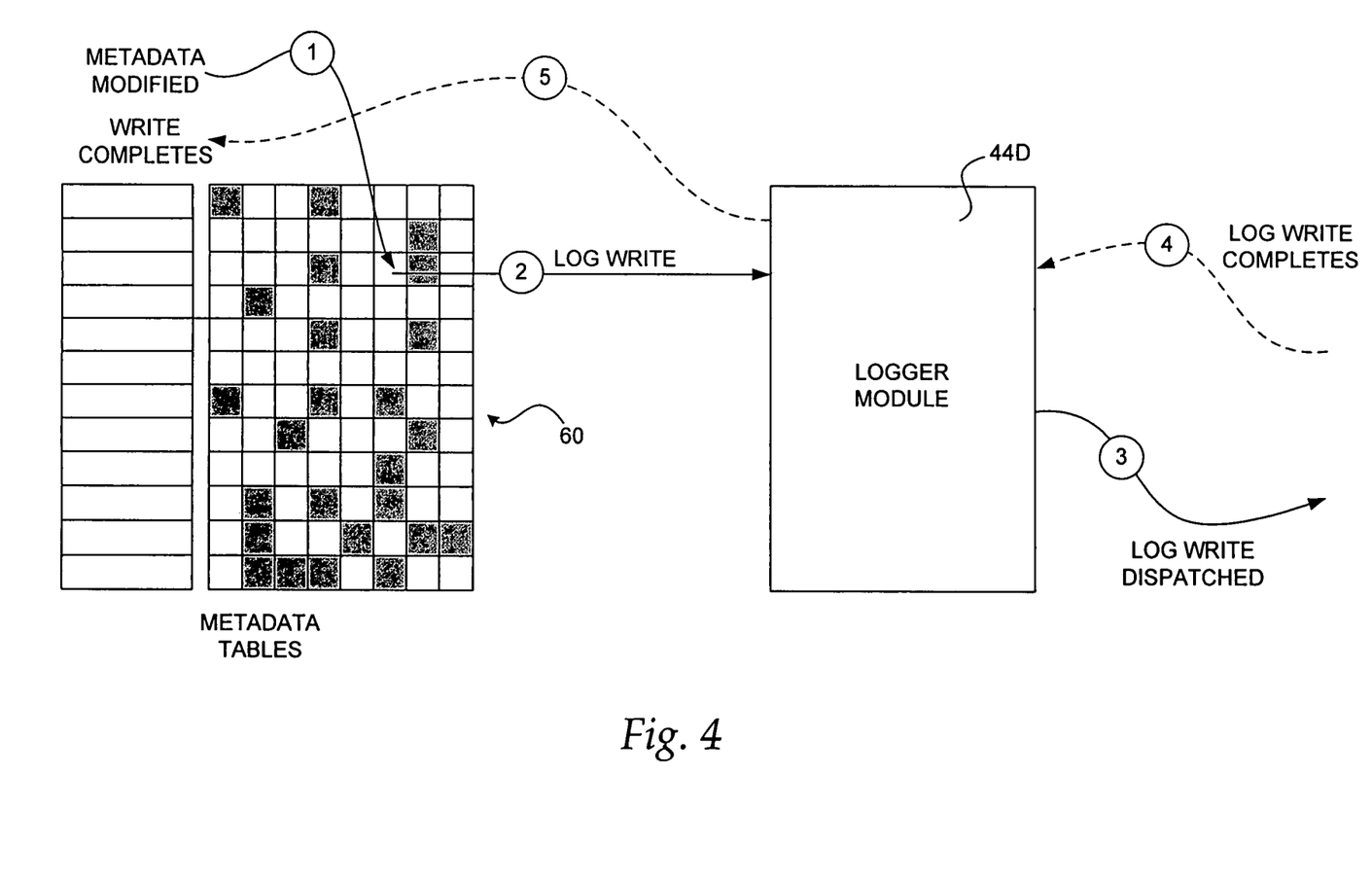
FIG. 4 is a block diagram showing aspects of a system for logging storage system metadata, including metadata tables and a logger module provided herein.

Referring now to FIG. 4, additional details will be provided regarding a software architecture for logging storage system metadata modifications within the server 2. In particular, FIG. 4 shows an illustrative piece of metadata in a storage system. The metadata is in the form of a table 60 with a bitmap whose bits are set when writes occur to locations on the disks 4 maintained by the storage system in the server 2. By maintaining the metadata in this manner, each of the bits of the bitmap may be utilized to determine when a corresponding location on the disks 4 maintained by the server 2 has been written to or not. This process is referred to herein as provision tracking. Additional details regarding the metadata utilized within an illustrative thin provisioning mechanism can be found in co-pending U.S. patent application Ser. No. 11/254,347, which was filed on Oct. 20, 2005, entitled "Method, System, Apparatus, and Computer-Readable Medium for Provisioning Space in a Data Storage System," and which is incorporated expressly herein by reference in its entirety.

As will be discussed in greater detail below, when a request arrives at the server 2 that would cause the metadata stored in the table 60 to change, the change in metadata is encapsulated in a log string. A portion of the log string identifies the kind of event that is being logged and the remainder of the log string contains information about the metadata change. The log string is dispatched to a logger module 44D in the form of a log write. The logger module 44D collects log strings from various metadata changes and writes them to disk sequentially. Log strings are written to disk by the logger module 44D when the total size of all outstanding log strings has exceeded a particular size, or when the log strings have aged beyond a particular predefined time period, or according to various other criteria that may be optimized for a particular storage system. The log strings are dispatched in a structure called a log buffer. The completion of the log buffer write to the disks 4 then signals the completion of each I/O operation that had caused a metadata change, and a consequent log string dispatch, to occur. Additional details regarding this process are provided below with respect to FIGS. 5-11. It should be appreciated that a reconstruction algorithm may be provided that is operative to read the log strings stored on disk and to recreate the table 60 from the log strings.

Figure 5:
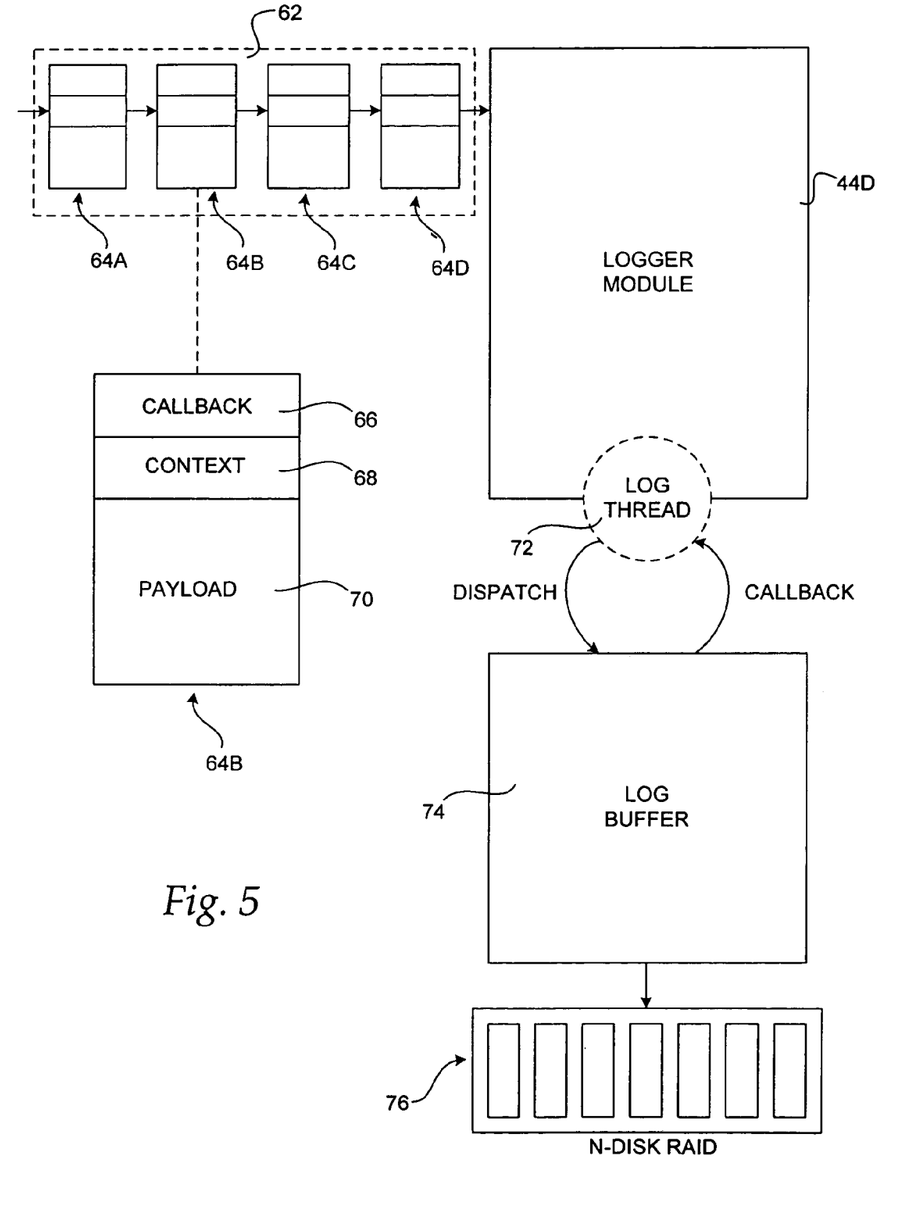
FIG. 5 is a block diagram showing aspects of a logger module and a log buffer provided by the implementations described herein.

Turning now to FIG. 5, additional details will be provided regarding an illustrative architecture for a computer system that utilizes the metadata logging features described herein. In particular, as shown in FIG. 5, log strings arriving at the logger module 44D are arranged together in a queue called the log queue 62. The log strings are encapsulated within a structure called a log context 64A-64D. Each log context 64A-64D includes a payload 70 that includes the actual log string, a callback 66, and a context 68. As will be described in greater detail below, the callback 66 may be called with the context 68 when the write of the log string to disk has been completed. As shown in FIG. 5, the log contexts 64A-64D are arranged together to form the log queue 62.

The logger module 44D is operative to execute a log thread 72. The log thread 72 performs the operations necessary to build and dispatch log buffers 74 to the underlying RAID volume 76. A log buffer 74 may be committed to disk by the log thread 72 as a result of one or more triggers. For instance, log buffers may be dispatched after collecting sectors of data. This allows log buffer writes to be considered as a strictly sequential data stream arriving at the disks, minimizing any performance penalty. In a RAID 5 system, log buffers may also be dispatched after a full stripe of data has been collected. This allows log buffer writes to avoid incurring RAID 5 write penalties. Log buffer writes may alternatively be performed in a manner that minimizes latency due to the batching of log strings. In a system implementing this manner of log buffering, there is typically one, or just a few, log buffer writes outstanding. Whenever a log buffer write completes, another one is dispatched with the outstanding log strings. If the log buffer is not full, the empty portions may be padded so that the log buffer reaches a full sector granularity. In this manner, the latency introduced into an I/O operation as a result of bunching and logging never exceeds the latency of one log buffer write.

Once a log buffer 74 has been collected in the manner described above, it is dispatched to a designated log area on the disks. The designated log area may be a sequential section of a RAID logical device, as shown in FIG. 5. Alternatively, it may be a set of log stripes throughout the logical devices, with temporal ordering maintained using a set of timestamps as discussed below. Organizing the log buffers in this manner helps reduce disk thrashing due to parallel data and log I/O operations. In either case, the data in the log buffers is arranged in such a manner that a reconstruction algorithm reading the log buffers will be able to identify the write order of the log strings. In this manner, the metadata can be recreated from the stored log strings. It should be appreciated that the stored set of log buffers may be referred to herein collectively as "the log."

After the log writes have been dispatched, they are completed by the underlying disks and the completion of the writes is signaled to the log buffer 74. When the log thread 72 receives the completion signal, it may take one of several actions. If the log module 44D is working in a single outstanding I/O operation mode, the completion signal triggers the next log write. If the logger module 44D is working below a cache 48 that is in write-through mode, the completion signal may also complete the I/O operations that initiated the log strings in the log buffer that was just written. The integration of logging metadata modifications with a write-through cache is discussed in greater detail below.

Figure 6:
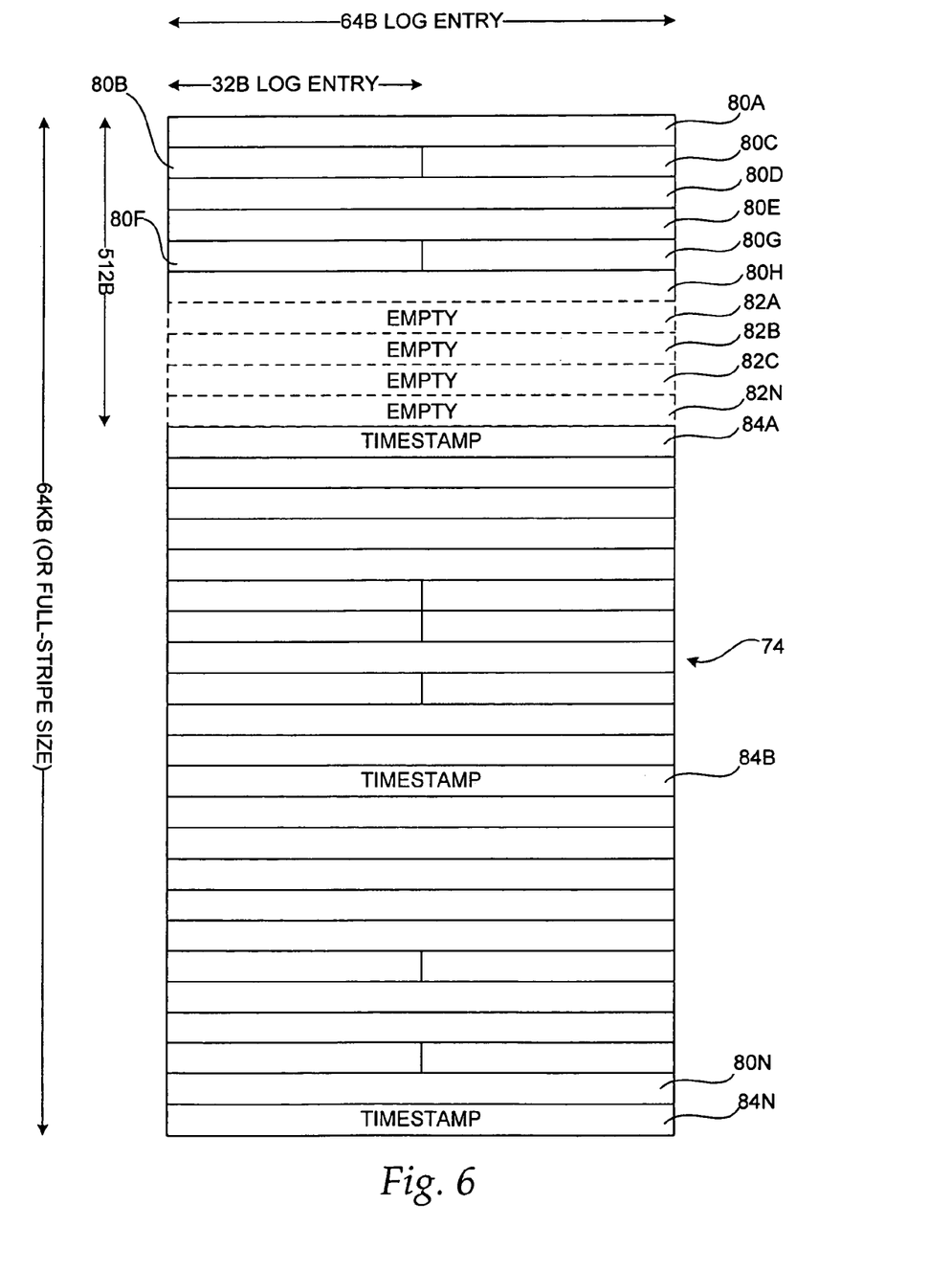
FIG. 6 is a data structure diagram illustrating aspects of a log buffer provided herein.

Referring now to FIG. 6, additional details regarding the layout of a log buffer data structure 74 will be provided. As shown in FIG. 6, the log buffer 74 can accommodate log strings of different sizes. In particular, log strings of 32 bytes, such as the entries 80B and 80C, can be included in the log buffer. Log strings of 64 bytes, such as the entries 80A and 80E-80E, can also be included. At the head of a log string is a header that identifies the type of log and the length of the log entry. It is therefore possible to parse the log without the necessity of fixed size log strings. This allows for increased efficiency of capacity utilization while storing the log.

If the log buffer is to be dispatched before it is completely full, it is necessary to increase the size of the log buffer to a complete sector, since a sector is the minimum granularity of an I/O operation to a disk. This is accomplished by inserting the necessary number of null log strings, such as the entries 82A-82N. When an algorithm for reconstructing the metadata from the log encounters a null log string, it is programmed to immediately ignore the remainder of the sector. In this regard, in order to determine where the log ends, one of several methodologies may be utilized. First, an end-of-log marker may be written at the end of the log, which keeps shifting forward with time. Alternatively, the log may be explicitly initialized with null strings before logging begins. A third method is to maintain a log pointer that points to the end of the log. Another method is to write a unique, constantly increasing timestamp 84A-84N at the end of each sector in the log. The timestamp 84A-84N can be utilized to distinguish between old and new log entries. A decrease in the value of the timestamp 84A-84N between two adjacent sectors, or a sudden and random jump in the value of the timestamp, means that the end of the log has been reached.

As discussed briefly above, the size of the log buffer may be made equal to either the RAID stripe size or the size of a full-row to improve performance. Making the size of the log buffer equal to the RAID stripe size ensures that a log write does not access two disk drives. Making the size of the log buffer equal to a full row avoids the imposition of RAID-5 write penalties.

Figure 7:
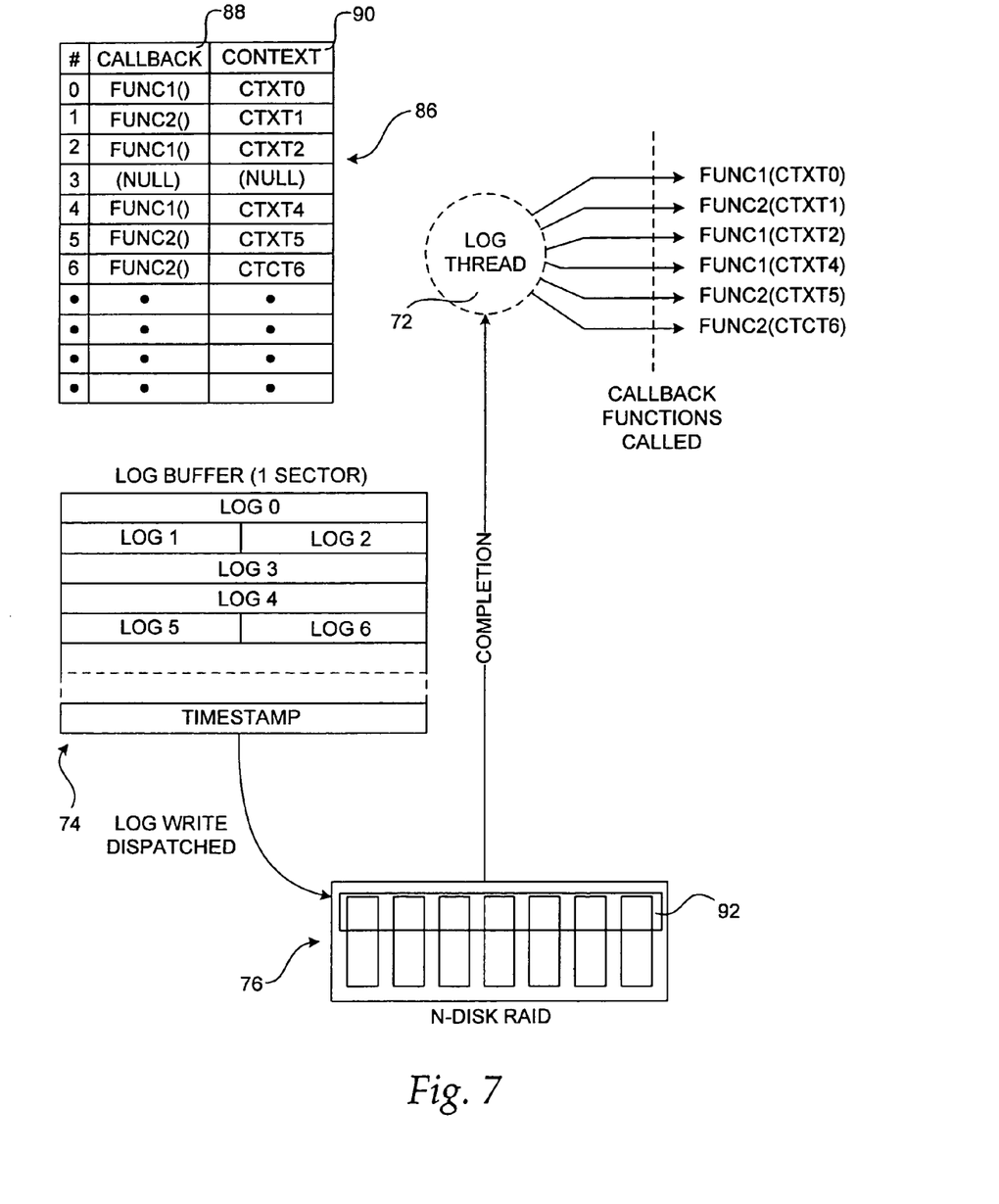
FIG. 7 is a block diagram showing details of the implementations provided herein for executing a callback in response to the completion of a metadata log write.

Turning now to FIG. 7, additional details will be provided with regard to how the implementations described herein are integrated with a write-back or a write-through cache. With regard to write-back caching, there is generally no disadvantage to losing log data as compared to losing data writes that are stored in the log in the event of a failure. This is generally true because applications do not expect data to be saved while running in cached mode. Instead, applications typically utilize their own data recovery mechanism when they want to benefit from write-back caching. Hence, there is no need to wait until a log write has been completed before signaling that an I/O generating the log write has been completed. Cache flushes and sync operations can be performed without synchronizing the data traffic with dependent metadata traffic. As a result, the logger module has no performance implications on either the throughput or the latency of data I/Os in a system with write-back caching.

With respect to write-through caching, however, applications expect an I/O operation that has received a completion signal from the storage system to be consistent and present on disk even the event of a catastrophic power failure. In order to accomplish this, data writes may only be completed to an initiator after the log strings for corresponding metadata writes have been successfully written to disk. This is accomplished by generating a callback when a log string has been successfully written to disk.

As discussed above with respect to FIG. 5, each log string arriving at the log queue 62 is accompanied by a context 68 and a callback 66. The callbacks and contexts are stored in an array 86 that includes one field 88 for the callbacks and another field 90 for the associated context. The array 86 is associated with the corresponding log buffer 74. The array 86 contains all of the callbacks and contexts for all log queue elements that are present in the buffer 74. When the log buffer 74 has been successfully written to the log area 92 of the disks, the array 86 is traversed. Each callback identified in the field 88 is called with the corresponding context in the field 90 by the log thread 72. The callback completes the I/O operation that initiated the metadata write.

Figure 8:
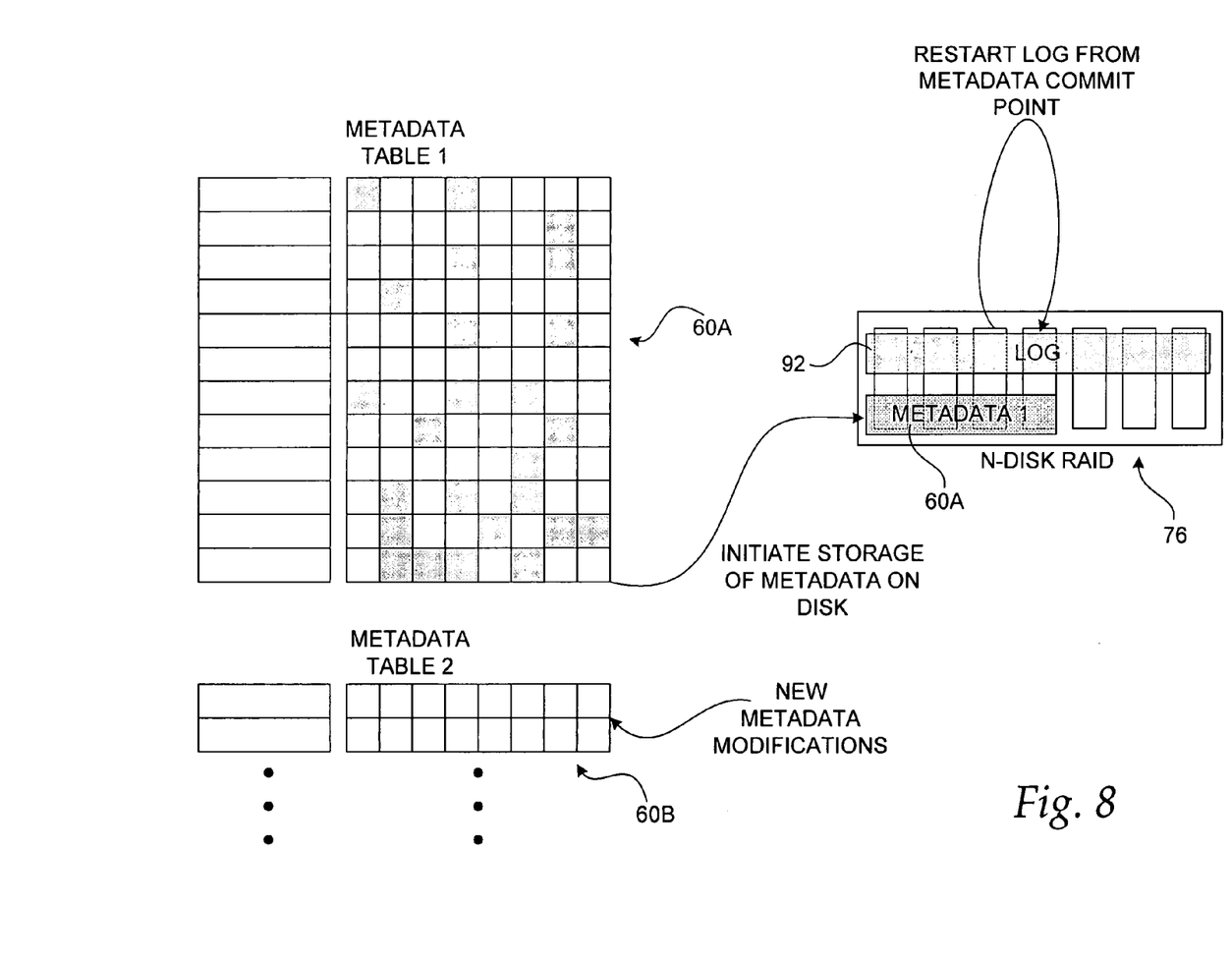
FIG. 8 is a block diagram showing details of the implementations provided herein for handling a full metadata log.

Referring now to FIG. 8, an illustrative method for handling a full log will be described. Before discussing the method, it should be noted however that the probability of a log exceeding the space that has been allocated for it is remote. This is because most metadata, especially metadata that is in the form of bitmaps, moves in one unique direction from a state of being unpopulated to a state of being fully populated. This requires a fixed number of changes, such as the setting of bits. With this constraint, it is obvious that the total number of changes required to fully populate the metadata will be limited. This is one benefit of using logging for the purpose of storing metadata of this nature because no change ever needs to be logged twice.

Notwithstanding the above discussion, a log may overflow due to irregular events or because a smaller log has been allocated than the maximum size. This is handled as described below. In particular, when a log is nearly full and is in danger of overflowing, the metadata structure of which changes are being logged is committed to the disk in its entirety. For instance, as shown in FIG. 8, the table 60A is committed to the disks 76. Logging is then restarted from the beginning. The presence of valid metadata 60A on the disk is an indication to the reconstruction algorithm to begin playing back the log 92 onto the committed metadata 60A. The log may, therefore, be considered a log of incremental changes since the last metadata commit.

Large metadata may take a substantial amount of time to complete writing to the disk. In this case, I/O availability may still be achieved by using a set of ping-pong buffers for the log and the metadata. As soon as the metadata write has been initiated, a second log buffer is opened up, and log writes are performed into that instead. Thus, if a power failure occurs, the later of the two log buffers is utilized to reconstruct the metadata.

The implementations described herein also provide a method of performing the operation of synchronizing metadata writes. In some implementations, the operation of committing metadata to disk is either done synchronously, so that no parallel I/O operations may take place while it is being performed, or by making a copy of the metadata into a separate buffer which is then flushed to disk. These methods guarantee that the metadata will be internally consistent when it is written to disk, but both suffer from performance penalties.

According to the embodiments provided herein, there is often no need for metadata to be internally consistent, so long as it can be reliably recovered from the new log. For example, if the major changes that are happening to the metadata are in the form of setting bits, then the effect of allowing the metadata to change while it is being committed to disk will be that some log entries that direct a particular bit to be set may find that the bit has already been set. The reconstruction algorithm can detect and ignore these instances. The method described above also has the effect of insulating the system against data loss if power fails in the process of committing the metadata since the data may then be recovered from the older metadata buffer and a combination of the two ping-pong buffers.

Figure 9:
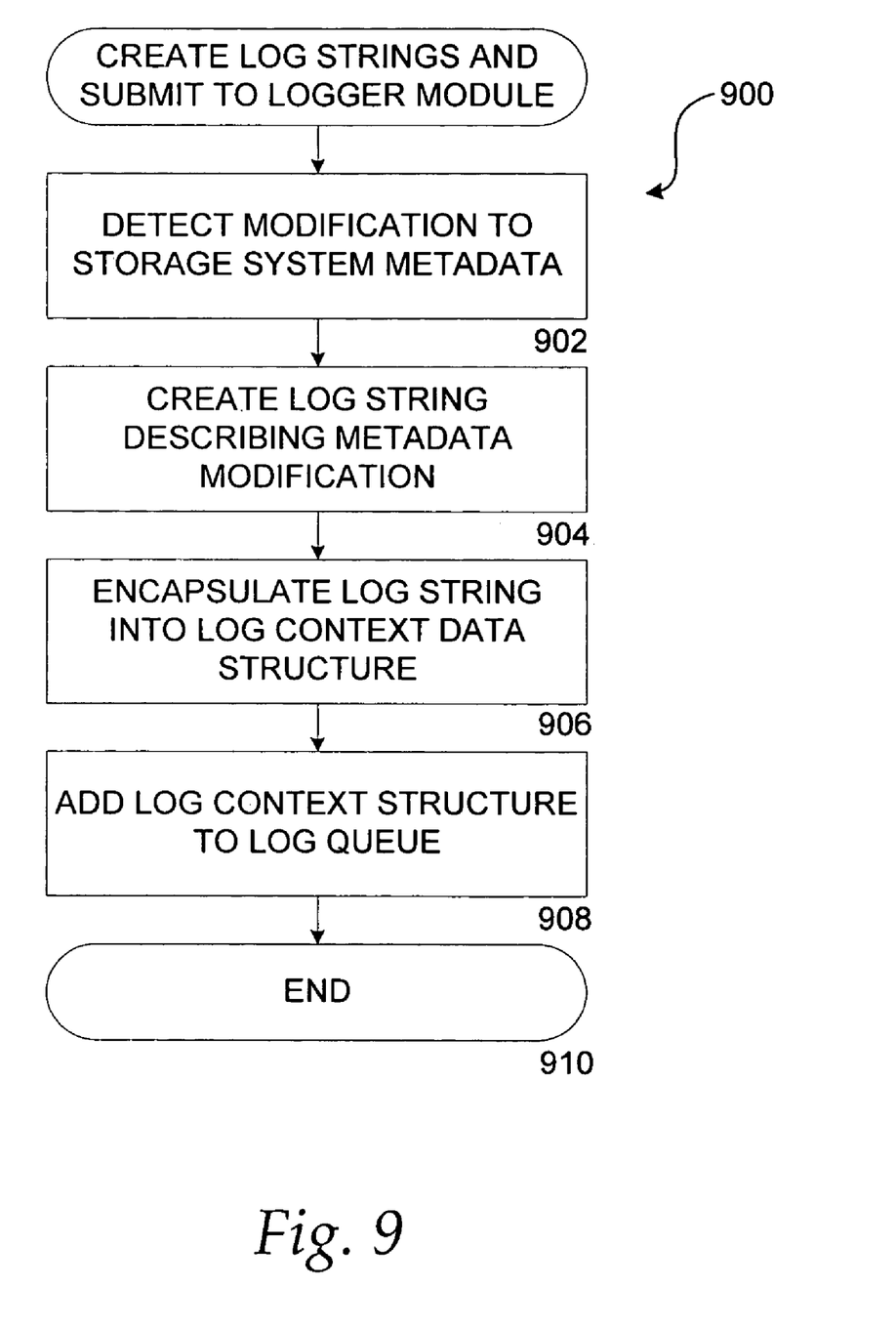
FIGS. 9-11 are flow diagrams illustrating aspects of the systems provided herein for logging metadata writes in a storage system.

Turning now to FIG. 9, additional details regarding the operation of the server 2 for logging metadata modifications will be provided. In particular, a routine 900 will be described illustrating operations performed by the computer 2 for generating log strings and submitting them to the logger module 44D. It should be appreciated that the logical operations of the various embodiments presented herein are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the aspects provided herein. Accordingly, the logical operations described herein and making up the embodiments described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 900 begins at operation 902, where a modification to the storage system metadata, such as the table 60, is detected such as in response to a data write operation. In response to detecting the modification, the routine 900 continues to operation 904 where a log string is created that describes the modification to the metadata. The routine 900 then continues to operation 906, where the log string is encapsulated into a log context data structure 64 along with a callback and a context. The routine 900 then continues to operation 908, where the log context data structure 64 is added to the log queue 62 for processing by the logger module 44D. Details regarding the processing performed by the logger module 44D are provided below with respect to FIGS. 10-11. From operation 908, the routine 900 continues to operation 910, where it ends.

Figure 10:
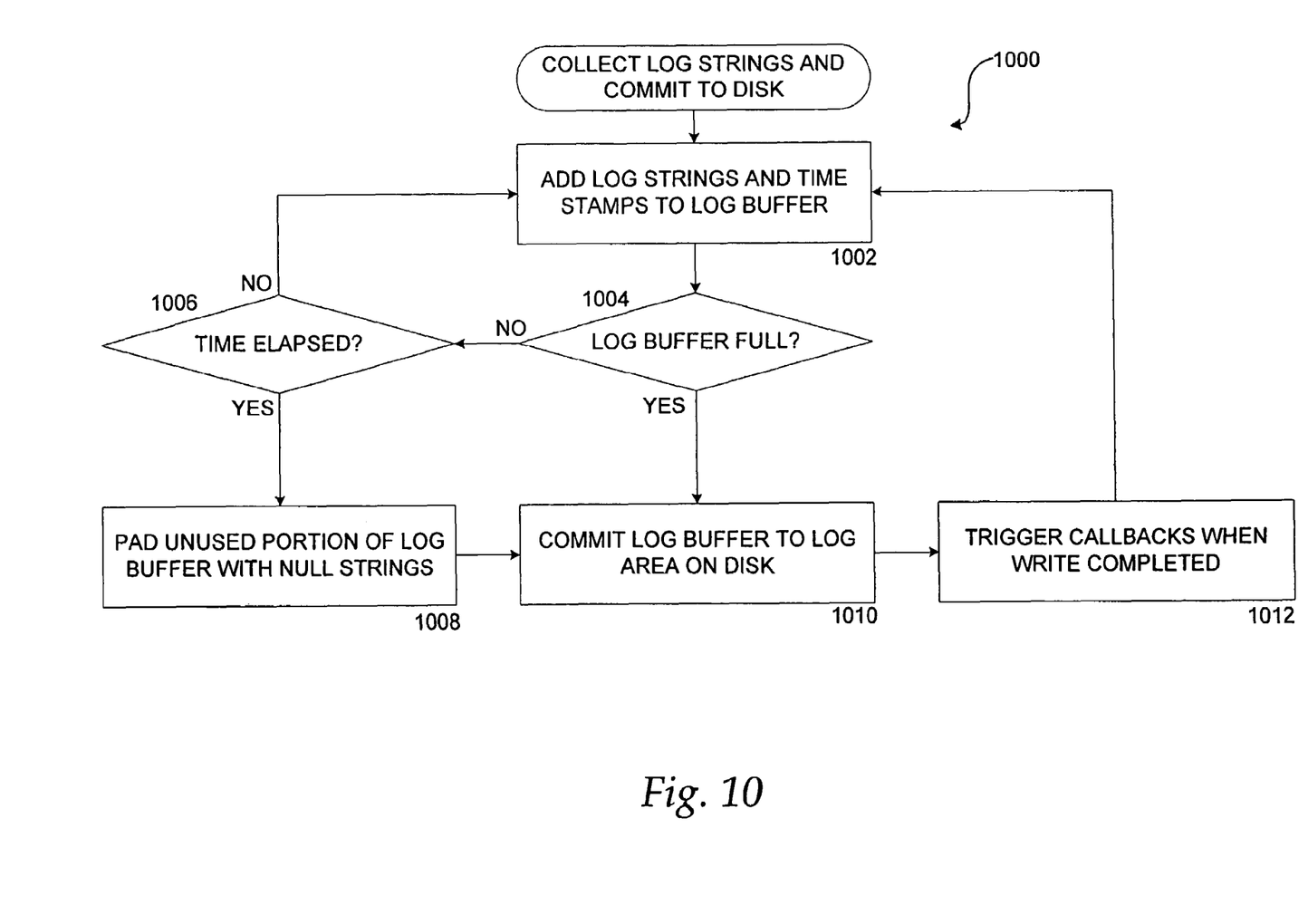

Referring now to FIG. 10, an illustrative routine 1000 will be described for collecting log strings and periodically committing the collected log strings to disk. In particular, the routine 1000 begins at operation 1002, where log strings contained in the log queue 62 are added to a log buffer 74. As discussed above, unique, constantly increasing timestamps may also be periodically added to the log buffer. From operation 1002, the routine 1000 continues to operation 1004.

At operation 1004, a determination is made as to whether the log buffer 74 is full. If not, the routine 1000 branches to operation 1006, where a determination is made as to whether a predefined period of time has elapsed since the last commit of a log buffer. If not, the routine 1000 branches from operation 1006 back to operation 1002. If the predetermined period of time has elapsed, the routine 1000 continues from operation 1006 to operation 1008, where the unused portion of the log buffer 74 is padded with null log strings. From operation 1008, the routine 1000 continues to operation 1010.

If, at operation 1004, it is determined that the log buffer 74 is full, the routine 1000 continues from operation 1004 to operation 1010. At operation 1010, a write of the log buffer 74 is initiated to the log area 92 on disk. From operation 1010, the routine 1000 continues to operation 1012, where the callbacks identified in the array 86 are called when the write of the log buffer 74 has completed. The routine 1000 then continues back to operation 1002, where additional log strings are stored on disk in a similar manner.

Figure 11:
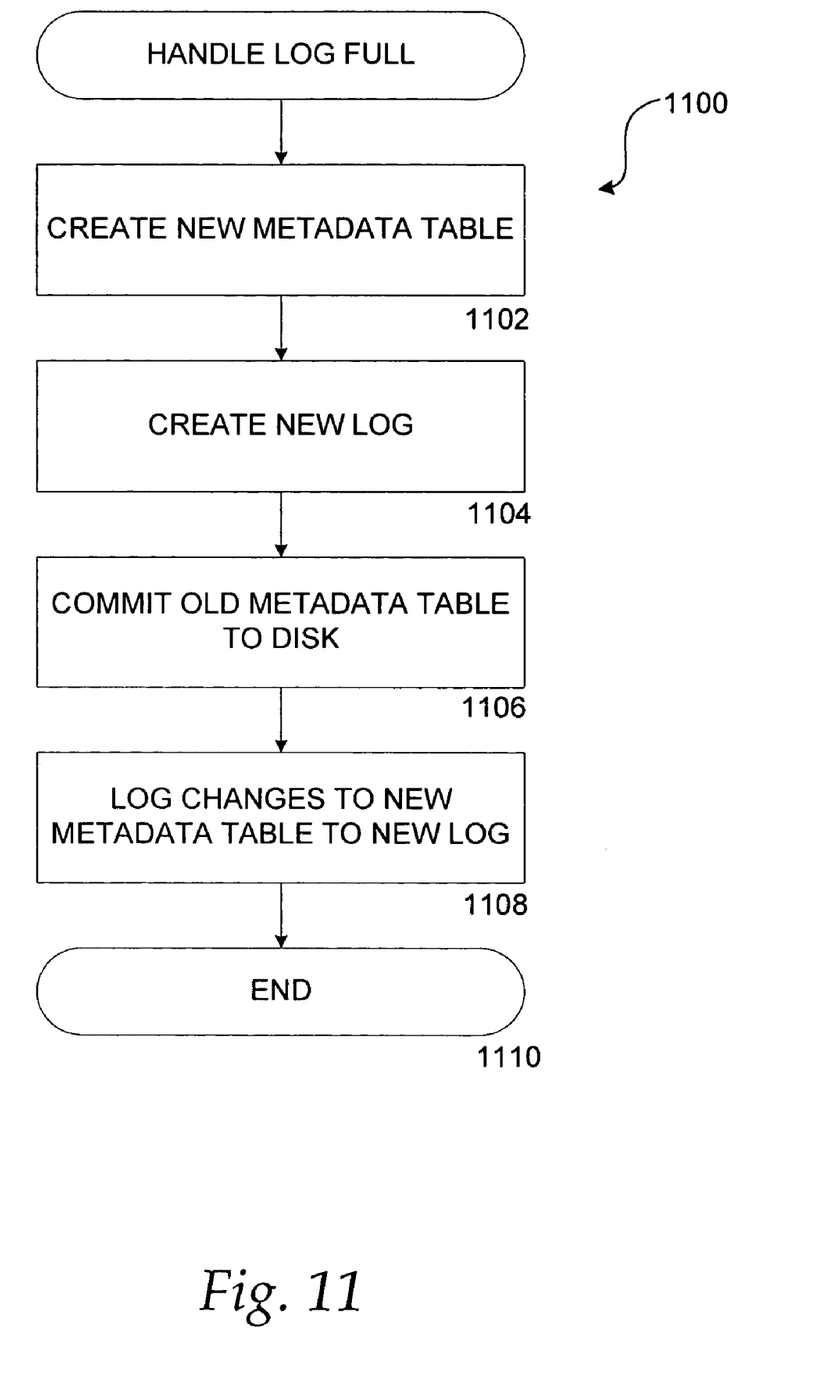

Turning now to FIG. 11, an illustrative routine 1100 will be described for handling a nearly full log. In particular, the routine 1100 begins at operation 1102, where a new metadata table 60B is created in response to determining that the log is full or nearly full. Once the new metadata table 70B has been created, the routine 1000 continues to operation 1104, where the log is restarted. The routine 1000 then continues to operation 1106, where the old metadata table 60A is committed to disk. From operation 1106, the routine 1000 continues to operation 1108, where metadata changes are made to the new metadata table 60B and to the restarted log in the manner described above. From operation 1108, the routine 1100 continues to operation 1110, where it ends.

It will be appreciated that embodiments described herein provide a method, apparatus, system, and computer-readable medium for logging metadata modifications in a data storage system. Although the implementations provided herein have been described in language specific to computer structural features, methodological acts, and computer readable media, it is to be understood that the invention defined in the appended claims is not necessarily limited to the specific structures, acts or media described. Therefore, the specific structural features, acts and mediums are disclosed as exemplary embodiments implementing the claimed invention. Moreover, it should be appreciated that, according to the embodiments presented above, the software described herein has been implemented as a software program executing on a server computer. Alternatively, however, the software operations described herein may be performed by a dedicated hardware circuit, by program code executing on a general-purpose or specific-purpose microprocessor, or through some other combination of hardware and software. Additionally, it should be appreciated that although the embodiments described herein have been presented in the context of logging changes to storage system metadata, the aspects described herein apply equally to any type of metadata that is modified on disk in a deterministic fashion.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method for logging metadata writes in a data storage system, the method comprising:

detecting a modification to storage system metadata within the data storage system;

in response to detecting the modification to the storage system metadata, describing the modification to the metadata in a log string comprising a type field for holding data describing the type of the modification to the metadata, a length field for holding data indicating the length of the log string, and a string field for holding data describing the metadata modification;

collecting log strings from one or more metadata modifications; and     periodically committing the collected log strings to a mass storage device in the data storage system;

wherein the log strings are committed to the mass storage device in a log buffer structure comprising the collected log strings and one or more unique constantly increasing timestamps that are written at the end of each sector of the log buffer, the log buffer structure being committed to a designated log area of the mass storage device;

wherein a logger module is configured to perform the collecting and committing operations and wherein the log strings are submitted to the logger module in a log context structure comprising a log string, a callback, and a context.

2. The method of claim 1, wherein periodically committing the log strings to a mass storage device comprises committing the log strings to a mass storage device when the combined size of the collected log strings exceeds a predefined size.

3. The method of claim 1, wherein periodically committing the log strings to a mass storage device comprises committing the log strings to a mass storage device when a predefined period of time has elapsed since a last commit of the log strings.

4. The method of claim 1, wherein the log area comprises a sequential section of a redundant array of inexpensive disks (RAID) logical device.

5. The method of claim 1, wherein the log area comprises a set of log stripes throughout one or more redundant array of inexpensive disks (RAID) logical devices.

6. The method of claim 1, wherein the logger module is further configured to determine whether a log write has completed for a log string and, in response to determining that the log write has completed, to call the associated callback with the context.

7. The method of claim 1, wherein the logger module is further configured to receive an indication that a log write has been completed by the mass storage device and, in response to receiving such an indication, to trigger a next log write.

8. The method of claim 1, wherein the logger module is further configured to receive an indication that a log write has been completed by the mass storage device and, in response to receiving such an indication, to signal the completion of one or more input/output operations that initiated the log strings in the log write that was completed.

9. The method of claim 1, wherein the metadata comprises a bitmap having one or more bits, each bit of the bitmap representing whether a storage location within the data storage system has been written to or not.

10. The method of claim 1, further comprising:
    upon determining that a predefined period of time has elapsed since a last commit of the log strings, determining whether a size of the log buffer structure is at least a minimum granularity value of the mass storage device; and
    upon determining that the size of the log buffer structure is not at least the minimum granularity value, inserting null log strings into the log buffer structure until the size of the log buffer structure is the minimum granularity value.

11. A computer storage medium having computer-readable instructions stored thereon that, when executed by a data storage system computer, cause the data storage system computer to:
    detect a modification to storage system metadata within the data storage system computer;
    in response to detecting the modification to the storage system metadata, describe the modification to the metadata in a log string comprising a type field for holding data describing a type of the modification to the metadata, a length field for holding data indicating a length of the log string, and a string field for holding data describing the modification to the metadata;
    collect log strings from one or more metadata modifications in a log buffer structure; and
    periodically commit the log buffer structure with the collected log strings to a mass storage device operatively connected to the data storage system computer;
    wherein each of the log strings are collected in the log buffer structure in a log context structure comprising the log string, a callback, and a context; and wherein the computer-readable instructions further cause the data storage system computer to, upon committing the log buffer structure to the mass storage device, call the callback associated with each of the log strings in the log buffer structure with the associated context to signal completion of one or more input/output operations that initiated the related metadata modification.

12. The computer storage medium of claim 11, wherein periodically committing the log buffer structure to the mass storage device comprises committing the log buffer structure to the mass storage device when a predefined period of time has elapsed since a last commit of the log strings; and wherein the computer-readable instructions further cause the data storage system computer to:
    upon determining that the predefined period of time has elapsed since the last commit of the log strings, determining whether a size of the log buffer structure is at least a minimum granularity value of the mass storage device, and
    upon determining that the size of the log buffer structure is not at least the minimum granularity value, inserting null log strings into the log buffer structure until the size of the log buffer structure is the minimum granularity value.

13. A computer storage medium having computer-readable instructions stored thereon that, when executed by a data storage system computer, cause the data storage system computer to:
    detect a modification to storage system metadata within the data storage system computer;
    in response to detecting the modification to the storage system metadata, describe the modification to the metadata in a log string comprising a type field for holding data describing a type of the modification to the metadata, a length field for holding data indicating a length of the log string, and a string field for holding data describing the modification to the metadata;
    collect log strings from one or more metadata modifications in a log buffer structure; and
    periodically commit the log buffer structure with the collected log strings to a mass storage device operatively connected to the data storage system computer;
    wherein periodically committing the log buffer structure to the mass storage device comprises committing the log buffer structure to the mass storage device when a predefined period of time has elapsed since a last commit of the log strings; and wherein the computer-readable instructions further cause the data storage system computer to
    upon determining that the predefined period of time has elapsed since the last commit of the log strings, determining whether a size of the log buffer structure is at least a minimum granularity value of the mass storage device, and
    upon determining that the size of the log buffer structure is not at least the minimum granularity value, inserting null log strings into the log buffer structure until the size of the log buffer structure is the minimum granularity value.

14. The computer storage medium of claim 13, wherein each of the log strings are collected in the log buffer structure in a log context structure comprising the log string, a callback, and a context; and wherein the computer-readable instructions further cause the data storage system computer to, upon committing the log buffer structure to the mass storage device, call the callback associated with each of the log strings in the log buffer structure with the associated context to signal completion of one or more input/output operations that initiated the related metadata modification.

* * * * *